United States Patent
Agarwal et al.

(10) Patent No.: US 7,334,062 B1
(45) Date of Patent: Feb. 19, 2008

(54) TECHNIQUE TO MONITOR APPLICATION BEHAVIOR AND TUNE REPLICATION PERFORMANCE

(75) Inventors: Ashish Agarwal, Mountain View, CA (US); Vikas Kailash Gupta, Santa Clara, CA (US)

(73) Assignee: Symantec Operating Corporation, Cupertino, CA (US)

( * ) Notice: Subject to any disclaimer, the term of this patent is extended or adjusted under 35 U.S.C. 154(b) by 316 days.

(21) Appl. No.: 10/624,396

(22) Filed: Jul. 22, 2003

(51) Int. Cl.
*G06F 3/00* (2006.01)
(52) U.S. Cl. .......................... 710/52; 710/56; 709/226; 709/248; 714/1; 714/6; 714/20
(58) Field of Classification Search ...................... None
See application file for complete search history.

(56) References Cited

U.S. PATENT DOCUMENTS

| | | | |
|---|---|---|---|
| 4,432,057 A | | 2/1984 | Daniell et al. |
| 5,680,573 A | * | 10/1997 | Rubin et al. ................. 711/129 |
| 6,049,809 A | | 4/2000 | Raman et al. |
| 6,601,187 B1 | | 7/2003 | Sicola et al. |
| 6,625,623 B1 | | 9/2003 | Midgley et al. |
| 6,658,540 B1 | | 12/2003 | Sicola et al. |
| 6,901,582 B1 | * | 5/2005 | Harrison ...................... 717/127 |
| 6,922,791 B2 | * | 7/2005 | Mashayekhi et al. ............ 714/4 |
| 7,007,044 B1 | * | 2/2006 | Rafert et al. ................. 707/203 |

2003/0188035 A1 * 10/2003 Lubbers et al. ............. 709/310

OTHER PUBLICATIONS

"VERITAS Volume Replicator™ 3.5—Configuration Notes"; Solaris; Jul. 2002/ N08849F; Copyright © 1998 2002; VERITAS Software Corporation; pp. 1-36.
"Reliable Broadband Communication Using A Burst Erasure Correcting Code"; Anthony J. McAuley; Computer Communication Research Group; Bellcore; Morristown, New Jersey; Presented at ACM SIGCOMM '90, Philadelphia, PA, Sep. 1990; pp. 1-10.

* cited by examiner

*Primary Examiner*—Alford Kindred
*Assistant Examiner*—Eron J. Sorrell
(74) *Attorney, Agent, or Firm*—Meyertons Hood Kivlin Kowert & Goetzel, P.C.; Rory D. Rankin (57) ABSTRACT

A method and mechanism for modifying computing resources in response to application behavior. A computing system includes a replication component configured to replicate data storage from a first data volume to a second data volume. In addition, the replication component is configured to monitor application I/O characteristics and store related statistics. I/O characteristics may include size, concurrency, locality, and frequency. I/O characteristics which are stored, and guidelines for modifying system resources based on those characteristics, may be displayed for use by an administrator in tuning system resources. Periodically, or in response to detecting an event, the replication component may automatically access the statistics and modify the system resources used by the replication system to better accommodate the application's behavior.

18 Claims, 6 Drawing Sheets

TECHNIQUE TO MONITOR APPLICATION BEHAVIOR AND TUNE REPLICATION PERFORMANCE

BACKGROUND OF THE INVENTION

1. Field of the Invention

This invention is related to the field of data communications and storage and, more particularly, to modifying system resources in response to application behavior.

2. Description of the Related Art

The ever expanding use of computing environments and electronic communications has resulted in an increased dependence of users on the availability of those environments. If an enterprise computing system goes down, or is otherwise unavailable, costs to the enterprise may be significant. Consequently, a number of techniques have arisen which are designed to ensure that a computing environment may detect and respond to problems without significantly impacting users. Computing environments which are configured to maintain consistent service for its users may be referred to as being "highly available". Some of the characteristics which are frequently considered when defining a highly available network include protection of data (Reliability), continuous access to data (Availability), and techniques for allowing the correction of problems in a manner which only minimally impacts users (Serviceability). Collectively these characteristics are sometimes referred to as RAS.

While a variety of computing environment configurations have arisen which attempt to satisfy the RAS requirements described above, one such configuration which has become popular is the "cluster". Generally speaking, a cluster is a collection of computing resources (or "nodes") which may be treated as a single computing resource. Typically, each of the nodes within the cluster represent fully realized computing resources in and of themselves. For example, a very simple cluster may include two nodes. Each of the two nodes in this simple cluster may include their own processing and storage resources and may be fully capable of providing service to network users on its own. Consequently, if a single node in a multi-node cluster were to fail, computing operations may continue. Larger computing environment configurations may include clusters with hundreds of nodes, computing grids with thousands of nodes, or a variety of other configurations.

One technique for increasing system reliability and availability includes the use of replicated data storage. For example, a computing cluster may be configured to include a primary node and a secondary node with users generally using the primary node. In the event the primary node fails, the secondary node may take over. However, in order to ensure the user's data is available and up to date once the secondary node takes over, the cluster may be configured to replicate the data from the primary node to the secondary node in "real-time." Generally speaking, replication entails first synchronizing a primary and secondary data volume to be identical, and subsequently reflecting all changes in data on the primary volume to the secondary volume. Typically, changes on the primary volume are reflected to the secondary volume by conveying writes on the primary volume to the secondary volume. While such techniques as replication may provide for greater reliability and availability, such techniques may also consume network, memory, or other resources. Consequently, replication may also negatively impact system performance.

SUMMARY OF THE INVENTION

The problems outlined above are in large part solved by a method and mechanism as described herein.

In one embodiment, methods and mechanisms for automatically modifying computing resources in response to application behavior are contemplated. The computing system includes a replication component which is configured to replicate data storage from a first data volume in a first node to a second data volume in another node. The system of replication includes a variety of buffers and memory pools whose configuration may affect system performance. The replication component is configured to monitor and store application I/O characteristics. Based upon the I/O characteristics of the application, the replication component may modify the resources used by the replication system to improve performance.

In one embodiment, the I/O characteristics which may be monitored include the size of a write, number of concurrent writes, locality, and frequency of writes. Modification of the system resources may include modifying the number and/or size of memory resources. In addition, review of I/O characteristics and modification may be performed based upon a fixed schedule or in response to detecting particular events.

BRIEF DESCRIPTION OF THE DRAWINGS

Other objects and advantages of the invention will become apparent upon reading the following detailed description and upon reference to the accompanying drawings in which.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION

Figure 1:
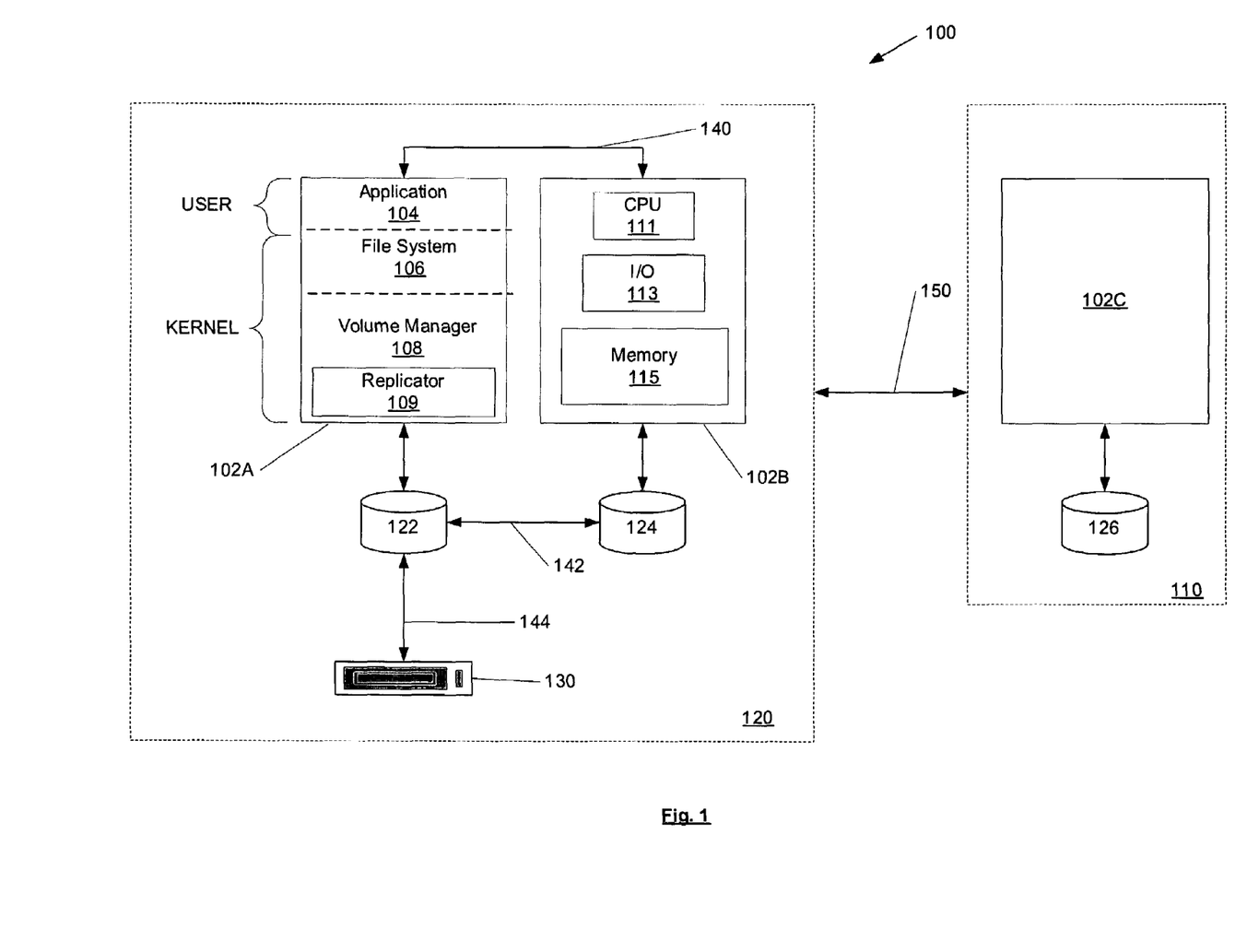
FIG. 1 is a diagram of a computing system.

FIG. 1 depicts one embodiment of a computer system. In the embodiment shown, three computing nodes 102A-102C are illustrated. Each of nodes 102A and 102B illustrate hardware, software, and/or resources which may be present within any of nodes 102. Elements referred to herein with a particular reference number followed by a letter will be collectively referred to by the reference number alone. For example, nodes 102A-102C may be collectively referred to as nodes 102. Node 102A illustrates an operating system architecture and various software components with which each of the nodes 102 may be configured. Generally speaking, the operating system includes a user space configured for use by user level applications 104, and a kernel which may include file system components 106 and a volume manager 108. Node 102A is also shown to be coupled to one or more volumes 122 for data storage. Node 102B illustrates various resources and/or hardware components and systems with which each of the nodes 102 may be configured. For example, each node 102 may include one or more processors (CPU) 111, I/O subsystem 113, and memory 115. While FIG. 1 depicts a particular configuration for system 100 and nodes 102, it is to be understood that numerous alternative configurations are possible and are contemplated.

In one embodiment, node 102A is coupled to a backup device 130 (such as tape backup) for backup and protection of data stored within volumes 122. In addition, to further improve system reliability, node 102B may be coupled to node 102A and configured to serve as a failover node in the event node 102A fails. In one embodiment, nodes 102 may include a replicator component/subsystem 109 which is configured to replicate data from one node to another. For example, node 102A includes a replicator component 109 which is configured to support replication of the data in volumes 122 to node 102B. Node 102B may include a similar replicator component which is configured to maintain volumes 124 as a replica of volumes 122.

In an alternative embodiment, nodes 102A and 102B may be configured to operate as a cluster 120. In such an embodiment, nodes 102A and 102B may be active in servicing network users. Further, volumes 122 and 124 may comprise shared storage for use by the cluster 120. In an embodiment where nodes 102A and 102B are configured as a cluster, node 102C may be configured as a failover node 110 for cluster 120. For example, cluster 120 may represent a local node and node 102C may represent a remote node 110 in a system maintained as a global cluster 100. Accordingly, replicator component(s) 109 in a local cluster 120 may be configured to support replication of data to the remote node 110. Remote node 110 may itself comprise a cluster of nodes or other network configuration. Numerous alternate configurations are possible.

Generally speaking, volume manager 108 and/or replicator 109 components may be provided to various enterprises for use in their respective computing systems. Frequently, the replicator 109 and related components are not provided by the same manufacturers which provide an enterprise with their hardware computing resources. Still further, the applications 104 which an enterprise uses may be provided by yet another party. Therefore, a given replicator component 109 may be designed to work with a wide variety of disparate applications. Consequently, while the various components and applications may be operable to work together, they may in fact be fairly independent in their operation with little, or no, real integration. Because the various components and applications in a given system may be relatively independent, configuring the system to operate optimally can be quite a challenge. Enterprises have different needs which are serviced by different applications 104. Still further, two enterprises using the same application 104 may not use the application in the same way. Due to this eclectic mix of hardware and software, tuning system performance generally entails an arduous series of trial and error.

Figure 2:
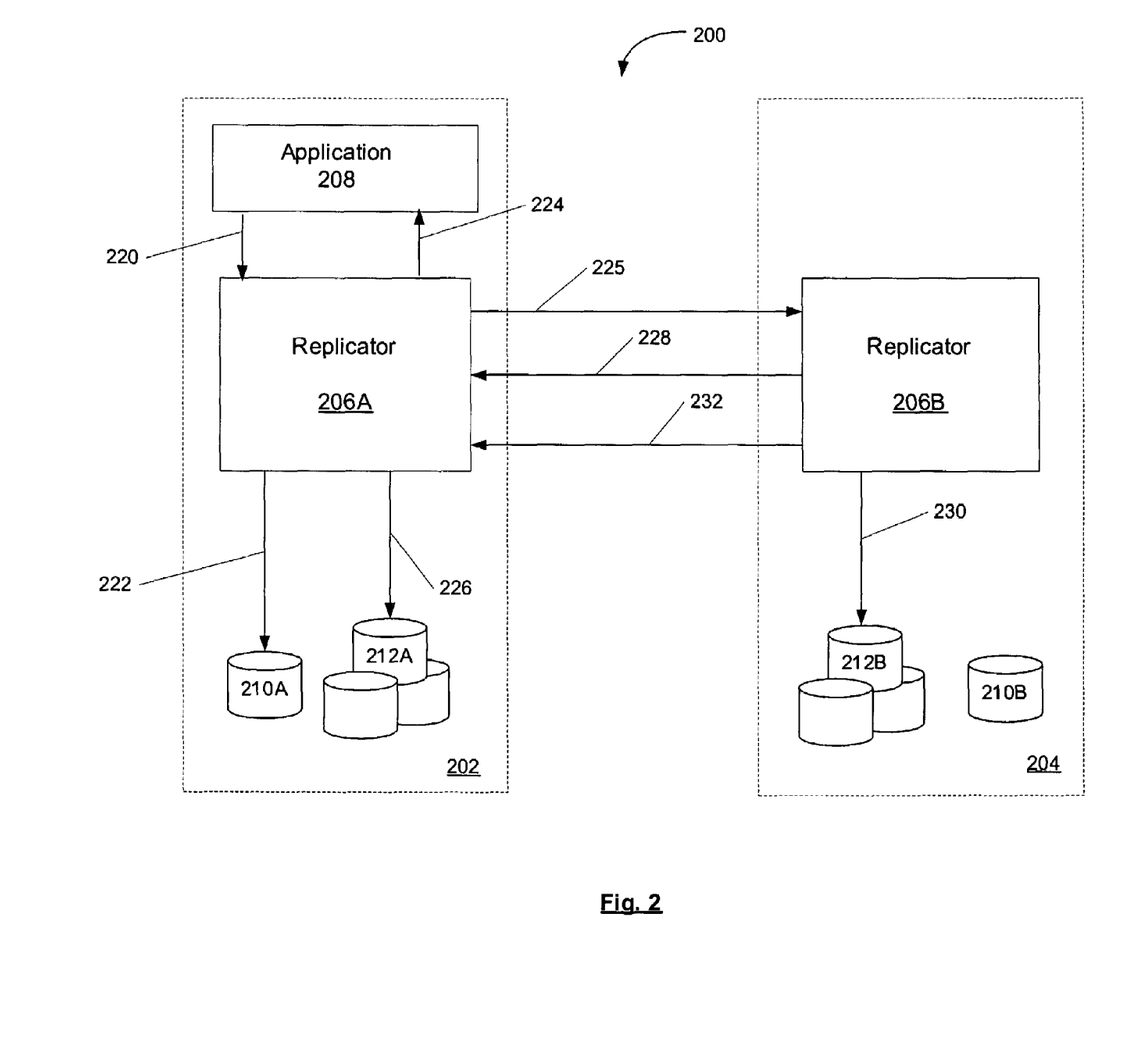
FIG. 2 illustrates one embodiment of a replication system.

Turning to FIG. 2, a system 200 configured to support replication is illustrated. System 200 includes a primary node 202 coupled to a secondary node 204. Each of nodes 202 and 204 may be configured similar to nodes 102 described in FIG. 1, though other configurations are possible. Primary node 202 includes an application 208 and replicator 206A. In one embodiment, application 208 includes software executing within a user space of an operating system while replicator 206A includes software operating within a kernel space of the operating system. Node 202 also includes a log volume 210A and data storage volumes 212A. Node 204 also includes a replicator component 206B, log volume 210B, and storage volumes 212B. In the example shown, storage 212B is configured to serve as a replica of data storage 212A.

In one embodiment, system 200 is configured to support transaction logging. As used herein, "transaction" includes, but is not limited to, writes to storage volumes 212 and other activities which may alter the content of volumes 212. Generally speaking, when a node 202 plans a write to volumes 212A, the write is first written to log 210A. If the node 202 suffers a crash or other interruption, recovery time may be reduced by examining the transactions logged in the log volume 210A. A simple example of the operation of system 200 is presented below.

Assume an application 208 initiates a write 220 to data volumes 212A. The write 220 is intercepted by the replicator 206A which then performs a corresponding write 222 to the log volume 210A. In various embodiment, the corresponding write to log volume 222 may be the intercepted write itself, or may include other data otherwise describing or indicating the nature of the write transaction. Subsequent to writing 222 to the log volume 210A, the replicator 206A returns a write completion indication 224 to the application 208. In response to the write complete indication 224, the application may treat the write 220 as having been completed. The replicator 206A then writes 226 the data to the data volumes 212A. Concurrent with the write 226 to the data volumes 212A, the replicator 206A conveys the write transaction to the secondary node 204. In response to receiving the write transaction 225, the replicator 206B on the secondary node provides an acknowledgement 228 to the primary node. Upon receipt of the acknowledgement 228, the primary node 202 may assume the secondary node 204 successfully received the write transaction 225. Finally, the replicator 206B writes 230 the data to the replication volumes 212B and then sends a data acknowledgement 232 to the primary node 202. The primary node 202 then marks the write as complete.

It is noted that alternative embodiments of system 200 may alter the sequence of events provided above. For example, in one embodiment the replicator 206A in the primary node may not indicate a write complete 224 to the application 208 until the secondary node 204 has indicated either successful receipt of the transaction 225 or a successful write of the data to the replica volumes 212B. In addition, in one embodiment, the write 222 to the log volume 210A, write 225 to the second node 206B, and write 226 to volumes 212A may be initiated concurrently. Various alternatives are possible and are contemplated.

Figure 3:
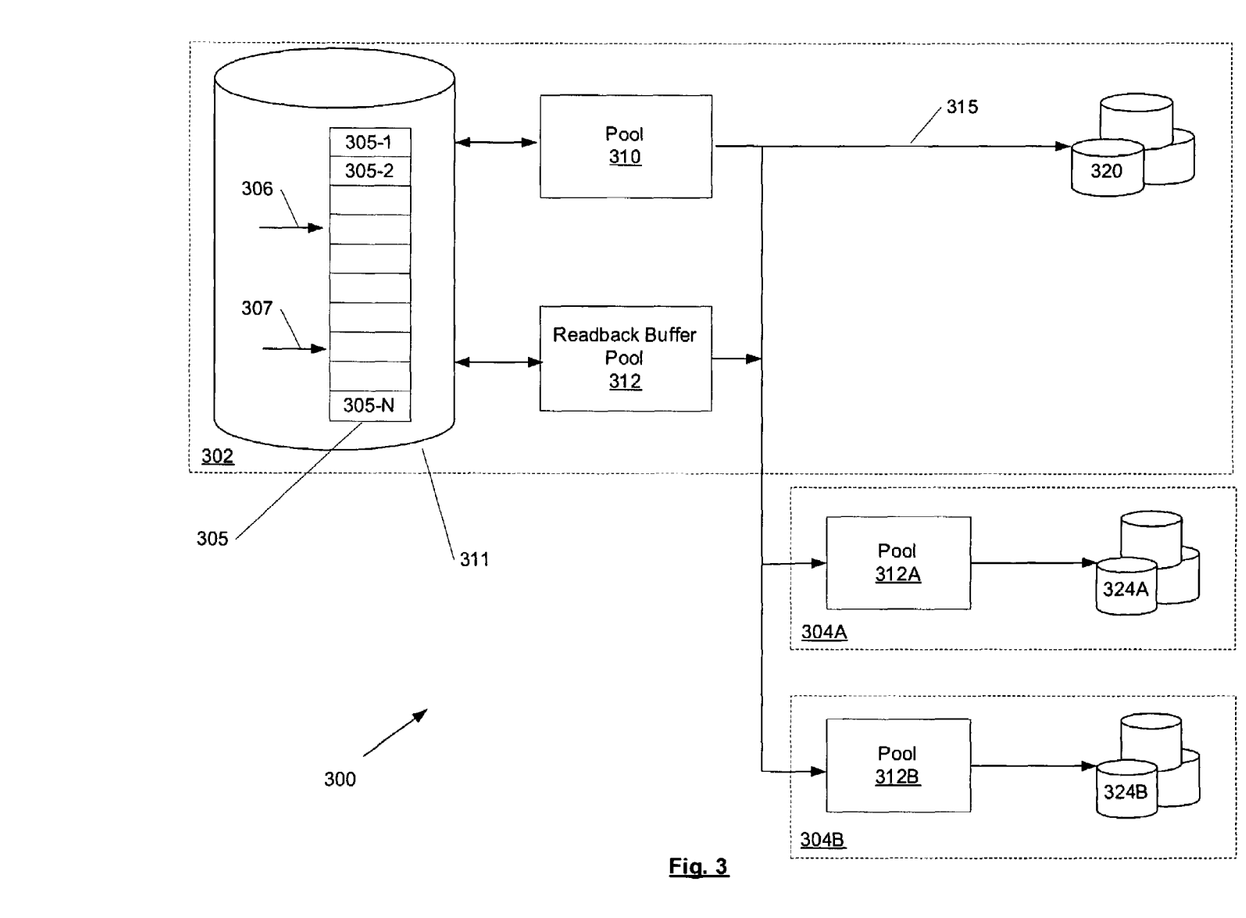
FIG. 3 illustrates one embodiment of a replication system.

In one embodiment, a variety of resources such as memory buffers, and the like may be utilized within the system 200 to store transactions and/or transaction related data. The configuration of these resources, including the number and size of resources, may have a significant impact on the performance of the system 200. FIG. 3 illustrates an alternative perspective of a system 300 configured to support and perform replication. In the embodiment shown, system 300 includes a primary node 302 and two secondary nodes 304A-304B. Each of the nodes illustrated also includes a memory pool (310, 312A-312B) from which buffers may be allocated to store transactions and/or transaction related data. Node 302 includes a log volume 311 and storage volumes 320. Each of nodes 304 also include storage volumes, 324A-324B respectively.

In one embodiment, pool 310 represents a memory pool of replication buffers within the primary node 302. Generally speaking, buffers are allocated from memory pool 310 to store write transactions intercepted by the replication component. Subsequent to storing transactions in a buffer, they are written to a log volume 311 as described above. In one embodiment, the log volume 311 includes a circular data structure/buffer 305 comprising multiple entries 305-1-305-N. In addition, log volume 311 may include pointers to indicate the head 306 and tail 307 of the buffer 305. Transactions which are written from a buffer to the log volume 311 are stored in the entry pointed to by the tail pointer 307. Subsequent to storing a new write in the structure 305, the tail pointer is incremented. Subsequent to storing the write in the structure 305, the write transaction may be conveyed from the memory pool 310 buffer via interconnect 315 to data storage volumes 320, as well as nodes 304A-304B.

In one embodiment, transactions are conveyed from buffer 305 in sequence by conveying the transaction indicated by the head pointer 306 and incrementing the head pointer 306 upon such conveyance. Transactions received by nodes 304A and 304B are stored in replication kernel buffers 312A-312B, respectively. In response to storing a received transaction in a buffer 312, the corresponding node 304 may be configured to return an acknowledgement of receipt to node 302. Finally, transactions stored within buffers 312 are conveyed to storage volumes 324 and an optional data write acknowledgement may be conveyed from nodes 304 to node 302 to indicate the data has been written to storage.

Because applications vary in their performance characteristics and I/O patterns, the performance of a replication subsystem (or other kernel level system) such as that shown in FIG. 3 may vary considerably depending on the particular application (104, 208) being used. Consequently, a particular configuration for the buffers (310, 305, 312) or other resources may provide good performance for one application while providing poor performance for another. In order for the system 300 to be able to replicate data at the speed at which is generated by the application, each component in the system must be able to keep up with the incoming writes. As illustrated by FIG. 3, the write path includes buffer 310, log volume 311, data volumes 320, interconnect 315, volumes 324, and optionally buffer 312. Accordingly, a number of components within the system 300 may require tuning in order to achieve a desired system performance.

In one embodiment, when a write transaction is received, the replicator component allocates buffer space from a memory pool 310 for the transaction. The amount of buffer space which is available for allocation can seriously affect system performance. For example, if the available pool 310 is too small, then writes may be held up while the replicator waits for current writes to complete. On the other hand, if the pool exceeds what is necessary, then resources are wasted.

In a further embodiment, allocated buffer space is not released until the corresponding data has been written to the log volume and any secondary nodes. As illustrated in the embodiment of FIG. 3, buffer 305 includes a queue with a limited number of entries. Therefore, if the rate of write transactions received by the log volume 311 exceeds the rate at which transactions are conveyed from the buffer 305 to nodes 304, buffer 305 will reach an overflow condition in which no entries are available for allocation. Consequently, node 302 maybe forced to postpone processing of received write transaction and system performance may suffer.

In one embodiment, if available space in the memory pool 310 becomes low, buffers which have been allocated from the pool 310 may be freed before the corresponding data is conveyed to the secondary nodes. In this manner, more space may be made available for incoming write transactions. While early freeing of buffers in this manner may make more space available for incoming write transactions, the data corresponding to the freed buffers must be subsequently read-back from the log volume 311 when it is time to convey the data to the secondary nodes. In one embodiment, data which is read-back from the log volume 311 is read into the read-back buffer 312 which then conveys the write to volumes 320 and nodes 304. Consequently, latencies may be introduced by the necessity for read-backs. In one embodiment, read-back buffer 312 may comprise a pool of buffers similar to memory pool 310. In view of the above discussion, it is apparent that system performance may be affected by configuring both the size of the memory pool from which buffers are allocated, the size of queue 305, and a "low memory" threshold which indicates when early freeing of buffers may be performed.

Another characteristic which can affect replication performance relates to the number of concurrent writes which are occurring within the system. A larger number of concurrent writes increases the bandwidth and other resource requirements for the system. Consequently, identifying the number of concurrent writes generated by a particular application may serve as one factor in tuning system resources. In one embodiment, the replicator component categorizes, or divides, application write transactions into separate "generations" such that writes which may have a causal dependency are in different generations. Writes within a given generation are not transferred for completion until all writes in previous generations have been completed.

Figure 4:
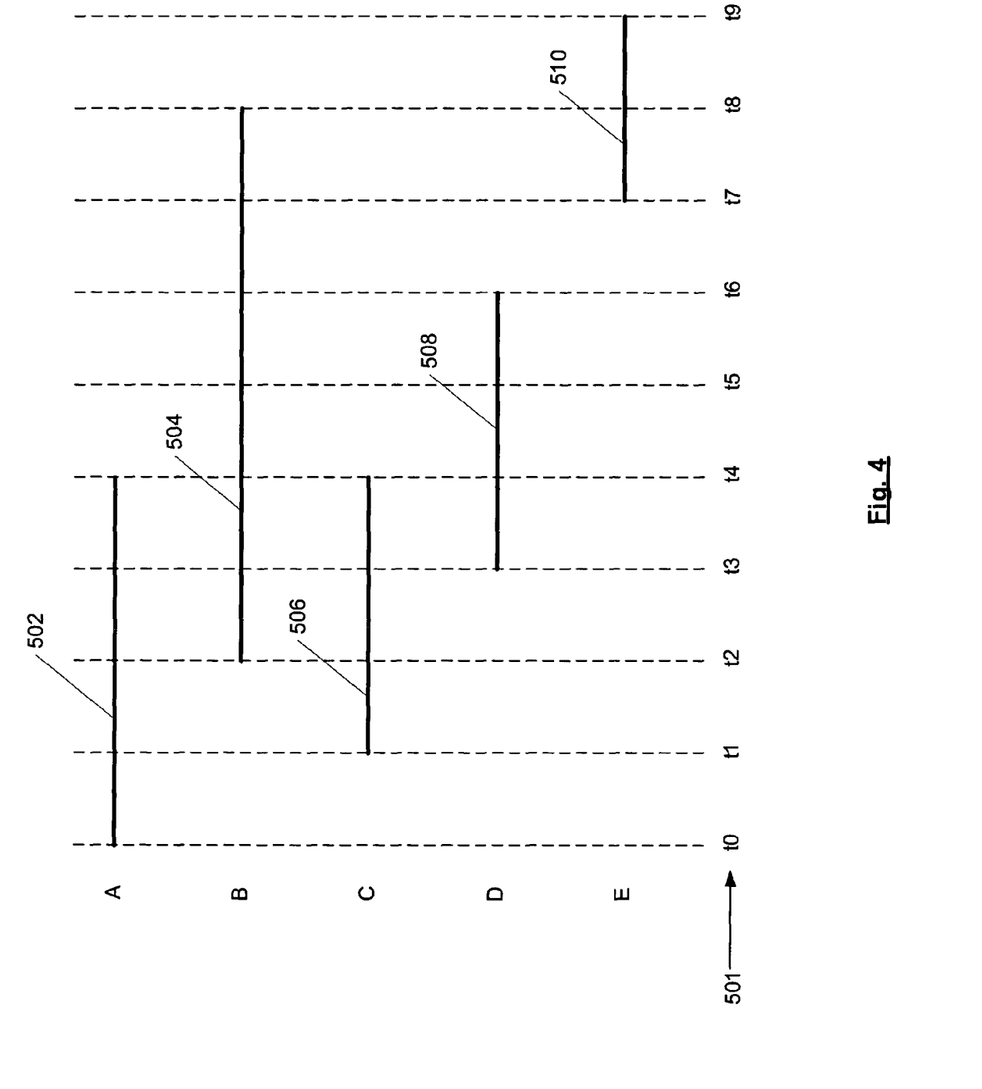
FIG. 4 depicts concurrent write transactions.

FIG. 4 illustrates one embodiment of a method for determining I/O concurrency. In the example of FIG. 4, five write transactions A-E are depicted. Also shown is a timeline 501 which indicates the start time and end time for each transaction. Generally speaking, in the method shown, a write that starts after completion of a previous write will be in a different generation than the first write. Utilizing this method, the number of writes in a generation may indicate the number of concurrent writes that a given application is issuing. In FIG. 4, each of the writes A-E represent individual writes issued by a particular application. For example, write A 502 begins at time t0 and ends at time t4. With respect to transaction A 502, time t4 represents the end of a given (Nth) generation.

In one embodiment, an application will wait for the completion of a write before issuing a causally dependent write. Since writes B 504, C 506, and D 508 begin before time t4, it may be assumed they are not causally dependent upon write A 502. Therefore, writes B 504, C, 506, and D 508 are also in the Nth generation. However, because write E 510 begins after the completion of write A 502 (i.e., time t4), it may have been dependent upon write A 502. Consequently, write E 510 is not part of the Nth generation. Note that although write B 504 and write E 510 overlap, write E may not necessarily depend upon write B 504. However, because write A 502 has been used in the present example to define the Nth generation, write E 510 is not included as part of the Nth generation.

Figure 5:
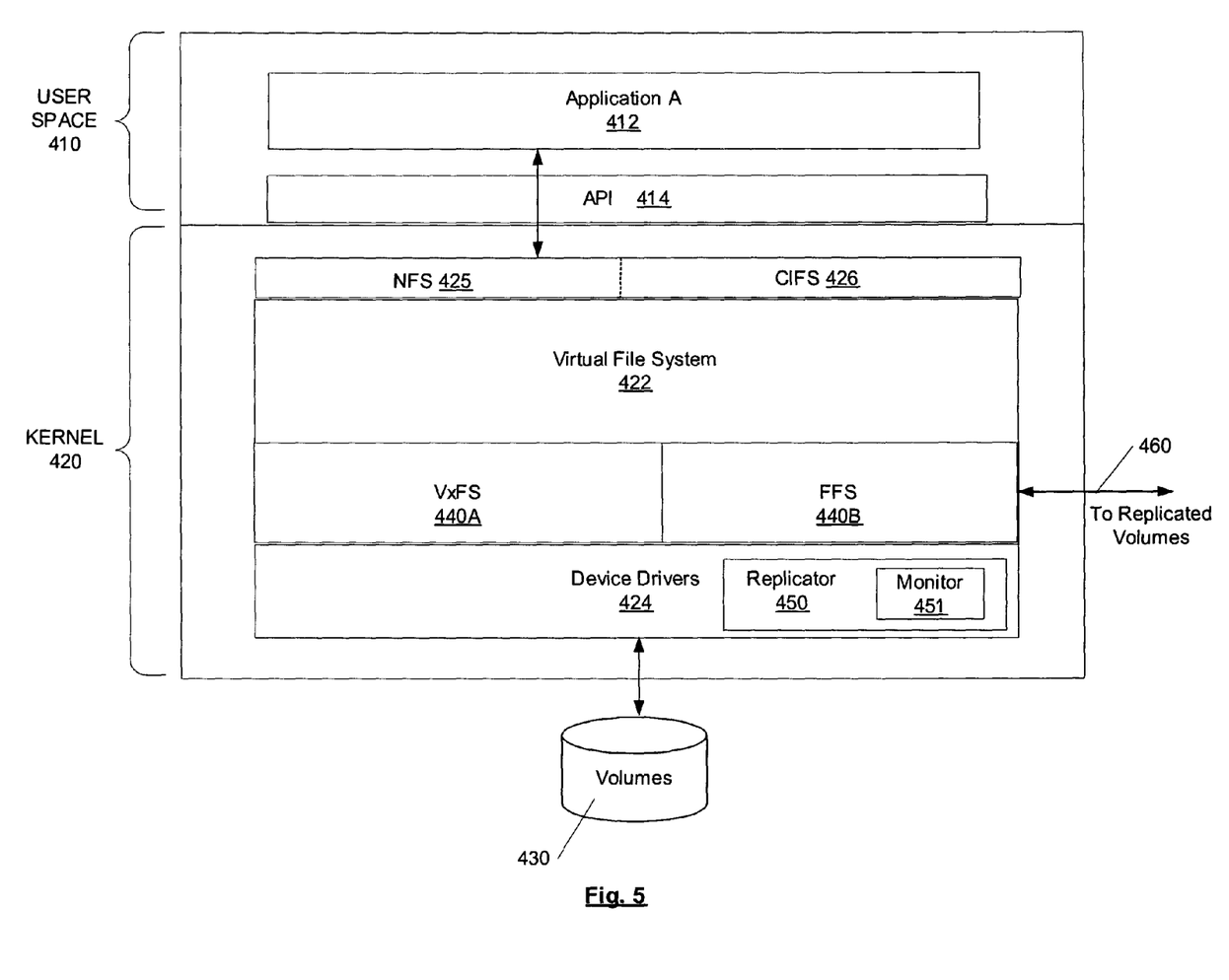
FIG. 5 illustrates one embodiment of an operating system.

FIG. 5 illustrates one embodiment of the architecture of an operating system 400 and storage. While numerous other architectures are possible and are contemplated, the example of FIG. 5 is provided for purposes of discussion. FIG. 5 illustrates that the architecture includes both a user space 410 and a kernel space 420. User space 410 includes application A 412. Application 412 is configured to initiate writes to volumes 430 through system calls via Application Programming Interface (API) 414. In the example shown, kernel 420 includes multiple local file systems 440 such as VxFS 440A and FFS 440B. A virtual file system 422 is also included which is configured to enable the use of multiple file systems 440 within a single operating system. In order to provide remote file access, file systems NFS 425 and CIFS 426 are included. Finally, kernel 420 includes device drivers 424 which are utilized in accessing volumes 430.

Also included in kernel 420 is a replicator component 450 configured to convey, or initiate conveyance, of transactions for replication via interconnect 460. In the embodiment shown, replicator 450 includes a monitor component 451. It is noted that monitor 451 need not be a part of replicator 450. In contrast, monitor 451 may itself represent an independent component. Monitor 451 is configured to monitor I/O performed by application 412 and store statistics related thereto. In addition, monitor 451 may be configured to distinguish I/O and other activity which is generated by the replicator component 450 from I/O activity generated by other entities. For example, in one embodiment the monitor 451 may be able to distinguish replicator 450 initiated I/O activity from I/O activity generated by other entities based upon a device driver entry point.

In one embodiment, a recommended system configuration may include assigning only a single application to each replicated volume group. When such a recommendation is followed, the monitor 451 may be able to deduce which application has generated a particular write based upon the driver entry point and the destination storage volume. Other embodiments may include identifying the source of a write transaction based upon process IDs, or otherwise. It is noted that while application 412 is shown exclusively in user space 410 and replicator component 450 is shown within a device driver level 424, application 412 and replicator 450 may occupy one or more other portions of an operating system.

Data which is monitored and recorded may include the number of concurrent I/O transactions, I/O size, and locality of I/O. Further, certain I/O metrics may be determined. Such metrics may include minimum, maximum, and average values for the monitored transactions, frequency distributions, the frequency that read after writes to the same block are occurring, and so on. Data stored by monitor 451 may include storage in memory and/or volumes 430, or otherwise. In addition, the stored data may be configured for access by administrative tools for purposes of review and use in tuning system resources.

In one embodiment, application I/O characteristics may be monitored and utilized in an automated/dynamic fashion to tune system resources. For example, the data which is monitored and stored by monitor 451 may be periodically accessed to assess system performance. In response to detecting certain conditions, various system resources may be reconfigured in order to improve system performance. In one embodiment, modification of system resources may be performed without the need to stop or otherwise interrupt operation of the application. For example, as described above, the replication mechanism may include a number of buffers and memory pools which are configurable. If the particular performance characteristics of an application indicate the memory pool is too small, the replicator component 450 may be configured to automatically enlarge the memory pool.

Figure 6:
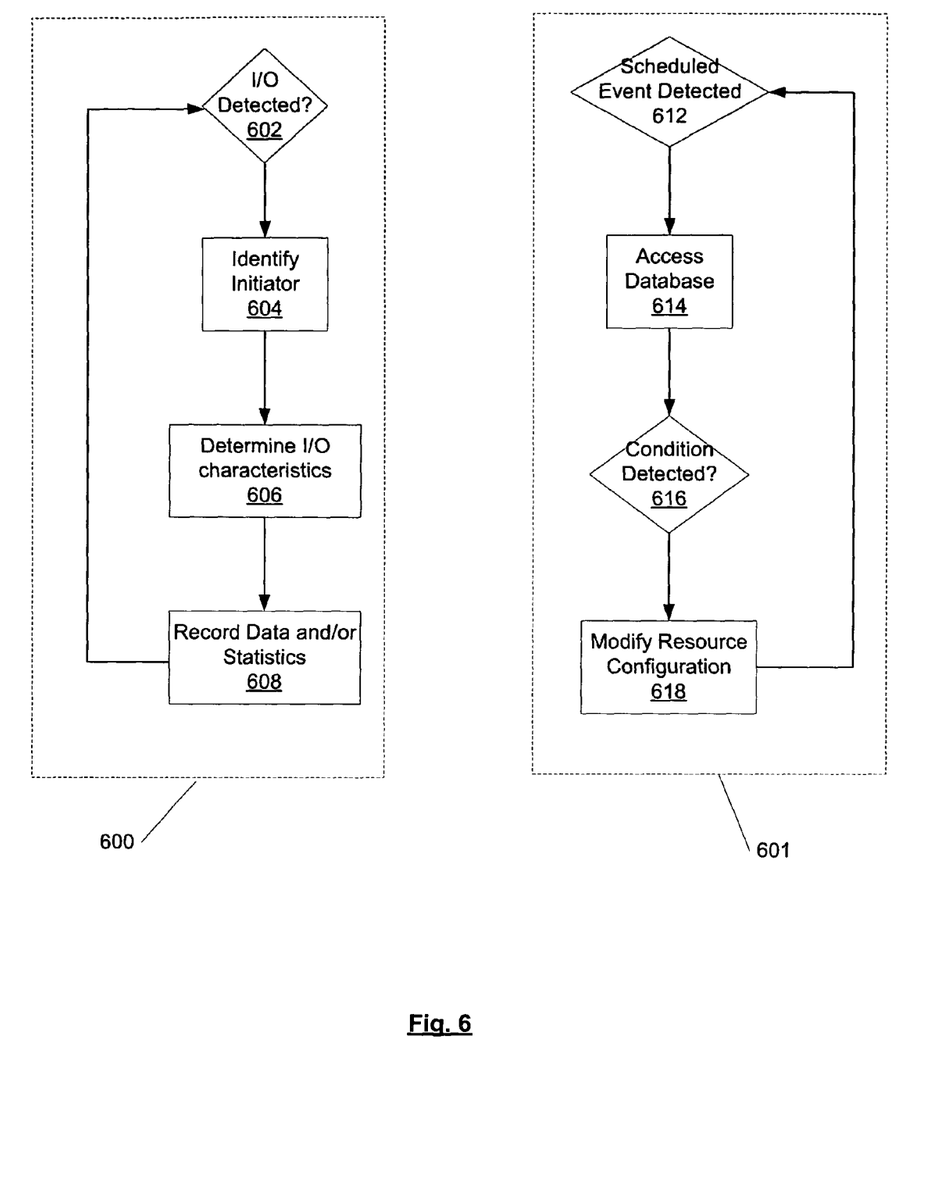
FIG. 6 illustrates one embodiment of a method for monitoring I/O and modifying resources.

Turning now to FIG. 6, one embodiment of a method in accordance with the foregoing description is provided. FIG. 6 illustrates two activities, activity 600 and activity 601, which may be performed concurrently by a replicator and/or monitoring component. A first activity 600 shows a process whereby I/O activity is monitored and recorded. For example, if an I/O transaction is detected (decision block 602), then the initiator is identified (block 604), the characteristics of the I/O transaction are determined (block 606), and data corresponding to the I/O transaction is recorded (block 608). In one embodiment, determining (block 606) and recording (block 608) data may be limited to certain entities within a system. For example, a monitoring component may be configured to only record statistics for applications. In such an embodiment, if the detected I/O transaction is not identified (block 604) as corresponding to one of the entities of interest, processing may return directly to decision block 602 from block 604. As already described, the data which is recorded (block 608) may not only include basic data which is observed (e.g., the size of particular transaction), but may also include various statistics based upon a history of transactions.

Activity 601 illustrates an embodiment wherein a system is configured to automatically adjust the configuration of system resources based upon recorded data and statistics (block 608). Other embodiments may support manual system reconfiguration based on the stored data by utilizing an administrator tool, such as a GUI based system configuration application. For example, a replicator component may be configured to retrieve and display stored I/O characteristic data for use by a system administrator in tuning system resources. In addition, the replicator may be configured to display suggested guidelines for tuning system resources and may also be configured to perform system resource modifications. As already noted, the replicator component may perform resource modifications automatically, or may enable a user to manually perform modifications. In one embodiment, the replicator component may provide guidelines for tuning resources based upon the stored characteristics. Additionally, the replicator component may be configured to analyze and evaluate modifications which are proposed by a user. For example, a user may propose enlarging a particular memory pool. In response, the replicator component may analyze the proposed modification in view of the stored characteristics, various heuristics, or otherwise. Such analysis may provide an indication as to the impact of the user proposed modifications on system performance and the replicator may provide a positive or negative recommendation regarding the proposed modification.

Still further, in addition to providing data, analysis, guidelines, and recommendations, the replicator component may be configured to graphically depict simulations of system operation. For example, the replicator may graphically depict data and/or system resource usage in the system—highlighting areas of congestion or other problems. Such graphical depictions may represent the current state of the system based upon stored characteristics or may represent a hypothetical configuration based upon proposed system modifications. In this manner a system administrator, or other user, may have the added benefit of graphical displays to aid in analyzing and modifying the system.

In the example of FIG. 6, a system may be scheduled to perform a review of the recorded data and statistics in order to determine whether resource reconfiguration is necessary or otherwise desirable. Such scheduled events (i.e., review) may be performed on a periodic basis, or in response to detecting the occurrence of certain system activity. For example, a review may be automatically performed 30 minutes after detecting the execution of a particular application. Alternatively, reviews may be performed every hour, or once a month. Numerous alternatives are possible and are contemplated.

In view of the above discussion, some examples illustrating the tuning of various resources is provided below. As mentioned above, the size of the write buffer space which is available for allocation may affect system performance. If the available space is too small, then incoming writes may be held up while the replicator component waits for current writes to complete. In addition, when buffer space is low, buffers may be freed early to make space available for incoming writes, which in turn necessitates readbacks. In order to alleviate these problems, the size of the memory pool from which the buffers are allocated may be increased. A larger memory pool increases the number of incoming writes, including concurrent writes, which may be accommodated and reduces the number of readbacks. While readbacks may increase system latency, the availability of such a mechanism may remain important. Therefore, the size of the readback buffer itself represents a parameter whose tuning may affect system performance.

Determining when to free buffers early may also be important. In one embodiment, a threshold may be set which indicates freeing of buffers early may be performed. For example, if the available buffer space falls below a certain level, writes may be freed early. In one embodiment, this threshold parameter may be based upon both the number N of concurrent writes to replicated volumes, and the average I/O size I. One example may include configuring the threshold to be a multiple of these values such as 3×N×I. As described above, N and I may be determined by the monitoring of I/O activity and related heuristics.

In addition to the above, the size of the memory chunks allocated or released may be important as well. For example, a larger granularity in memory allocation size may reduce CPU overhead because fewer allocation may be needed. For applications which perform large writes, increasing the size of the memory chunk size may improve system and replication performance.

In addition to the above, the amount of buffer space available on a secondary node may impact system performance as well. If a secondary node is short of buffer space, it may reject writes received from a primary node which may in turn force the primary node to resend the write. Consequently, operation of the primary node may be slowed. Therefore, the buffer space on the secondary node should be large enough to accommodate received writes without unduly slowing the network. However, if the secondary buffer is too large, further problems may develop depending on the system configuration. As described in relation to FIG. 2, a particular system may include a variety of acknowledgements from a secondary node to a primary node to indicate completion of certain activities. For example, when the secondary node receives a write transaction, the secondary may send an acknowledgement to indicate the transfer is complete. When the secondary writes the data to the data volume, another acknowledgement may be sent to the primary to indicate completion.

However, in one embodiment, the primary and secondary nodes may only be configured to maintain a connection for a predetermined amount of time. If the second acknowledgement is not received within this period of time, the primary node may disconnect. While reconnection may be initiated, network flow may be disrupted. If the buffer on the secondary node is too large, the time period between the first and second acknowledgement may be larger than the predetermined period and disconnects may increase. Consequently, the size of the secondary buffer should be adjusted so that a received transaction is written by the secondary within the predetermined period of time. It is noted that the appropriate size of the secondary buffer may depend upon the rate at which data can be written to disk, which depends on the disks themselves, the I/O bus, the system load, and the nature of the writes (random, sequential, large, small, etc.). So for example, if the time period is one minute, and the write rate is W megabytes/second, the size of the buffer may be chosen to be no larger than W*50 megabytes- or 50 seconds worth of writes.

Various embodiments may further include receiving, sending or storing instructions and/or data implemented in accordance with the foregoing description upon a carrier medium. Generally speaking, a carrier medium may include storage media or memory media such as magnetic or optical media, e.g., disk or CD-ROM, volatile or non-volatile media such as RAM (e.g. SDRAM, RDRAM, SRAM, etc.), ROM, etc. as well as transmission media or signals such as electrical, electromagnetic, or digital signals, conveyed via a communication medium such as network and/or a wireless link.

Numerous variations and modifications will become apparent to those skilled in the art once the above disclosure is fully appreciated. It is intended that the following claims be interpreted to embrace all such variations and modifications.

What is claimed is:

1. A computing system comprising:
   an application configured to initiate write transactions;
   a first storage device configured to store data corresponding to said write transactions;
   a memory pool; and
   a replicator component configured to:
      monitor said write transactions;
      allocate buffers from said memory pool for said write transactions; and
      automatically modify system resources in response to I/O characteristics of said monitored write transactions, wherein modifying said system resources includes modifying a size of said memory pool;
   wherein said application, first storage device, and replicator are within a first node of said system, and wherein said system includes a second node with a second storage device coupled to said first node, wherein said replicator component is further configured to convey said write transactions to said second node.

2. The computing system as recited in claim 1, wherein said replicator is further configured to record data indicative of said characteristics.

3. The computing system as recited in claim 2, wherein said replicator is further configured to:
   provide said recorded characteristics for display;
   provide guidelines to a user for modifying resources of said system; and
   modify said resources based upon user input.

4. The computing system as recited in claim 1, further comprising a log volume, and wherein said replicator is further configured to store said write transactions in said log volume.

5. The computing system as recited in claim 1, wherein said second node includes a pool of buffers, each of which is configured to store a write transaction received from said first node, and wherein said replicator component is further configured to modify a size of said pool of buffers in said second node in response to said characteristics.

6. The computing system as recited in claim 5, wherein said replicator component is configured to access said recorded data responsive to detecting an event.

7. The system of claim 1, wherein said second node is configured to serve as a failover node if the first node fails.

8. A method comprising:
- initiating write transactions in a first node of a computing system;
- allocating buffers from a memory pool for said write transactions;
- storing data corresponding to said write transactions in a first storage device of the first node;
- monitoring said write transactions;
- automatically modifying system resources in response to I/O characteristics of said monitored write transactions, wherein said modifying includes modifying a size of said memory pool; and
- conveying said write transactions to a second node of the computing system and storing data corresponding to said write transactions in the second node.

9. The method as recited in claim 8, further comprising recording data indicative of said characteristics.

10. The method as recited in claim 9, further comprising:
- providing said recorded statistics for display;
- providing guidelines to a user for modifying resources of said system; and
- modifying said resources based upon user input.

11. The method as recited in claim 8, further comprising storing said write transactions in a log volume.

12. The method as recited in claim 8, wherein said second node includes a pool of buffers, each of which is configured to store a write transaction received from said first node, and wherein said method further comprises modifying a size of said pool of buffers in said second node in response to said characteristics.

13. The method as recited in claim 12, further comprising accessing said recorded data responsive to detecting an event.

14. The method of claim 8, wherein said second node is configured to serve as a failover node if the first node fails.

15. A machine readable storage medium comprising program instructions, wherein said program instructions are executable to:
- initiate write transactions in a first node of a computing system;
- allocate buffers from a memory pool for said write transactions;
- store data corresponding to said write transactions in a first storage device of the first node;
- monitor said write transactions;
- automatically modify system resources in response to I/O characteristics of said monitored write transactions, wherein modifying said system resources includes modifying a size of said memory pool; and
- convey said write transactions to a second node of the computing system and store data corresponding to said write transactions in the second node.

16. The storage medium as recited in claim 15, wherein said program instructions are further executable to record data indicative of said characteristics.

17. The storage medium as recited in claim 15, wherein said program instructions are further executable to:
- convey said write transactions from a first node to a buffer allocated from a pool of buffers within a second node; and
- modify a size of said pool of buffers in said second node in response to said characteristics.

18. The storage medium of claim 15, wherein said second node is configured to serve as a failover node if the first node fails.

\* \* \* \* \*